T. OLSEN.
PACKING FOR TESTING MACHINES.
APPLICATION FILED AUG. 20, 1909. RENEWED JULY 13, 1912.
1,036,314.  Patented Aug. 20, 1912.
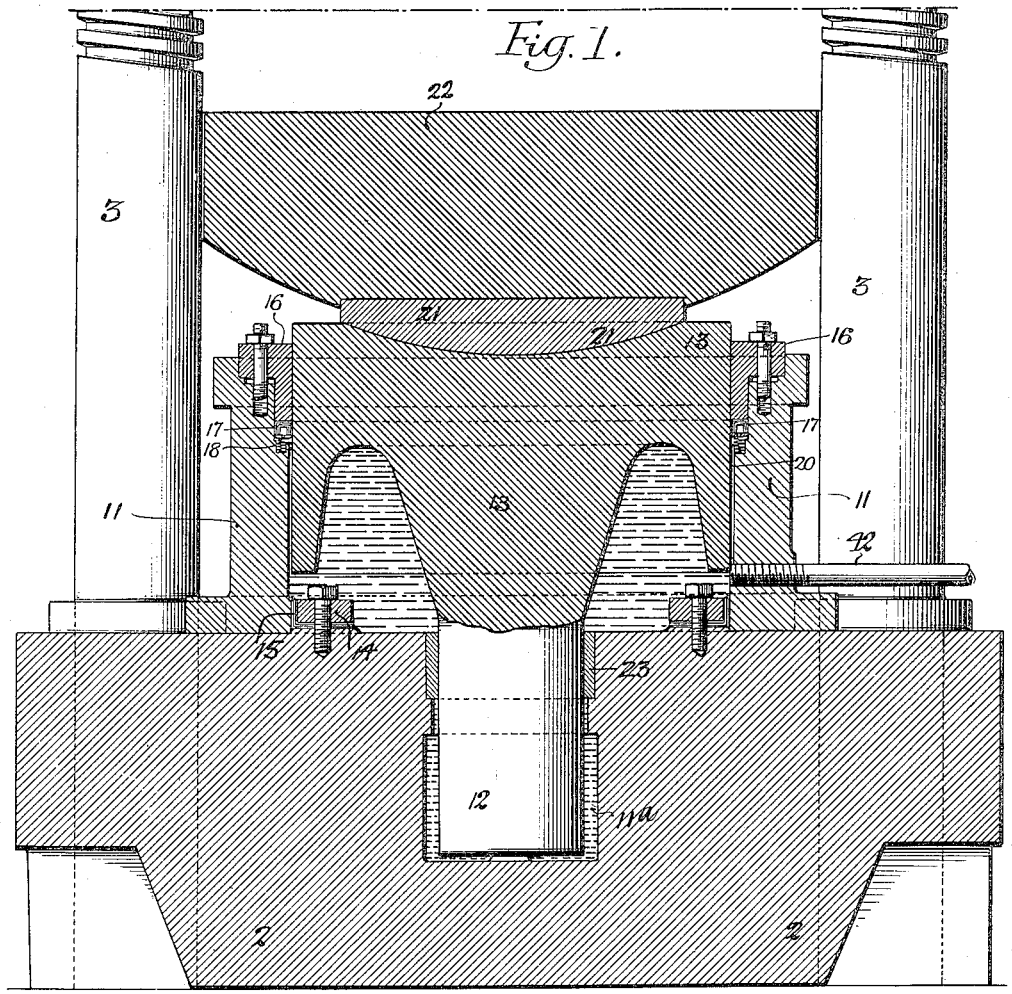
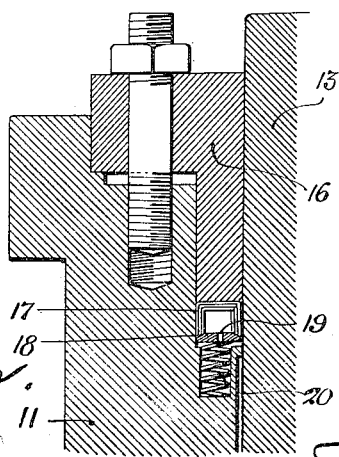

UNITED STATES PATENT OFFICE.

TINIUS OLSEN, OF PHILADELPHIA, PENNSYLVANIA.

PACKING FOR TESTING-MACHINES.

1,036,314.        Specification of Letters Patent.        Patented Aug. 20, 1912.

Application filed August 20, 1909, Serial No. 513,856.   Renewed July 13, 1912.   Serial No. 709,268.

*To all whom it may concern:*

Be it known that I, TINIUS OLSEN, a citizen of the United States, residing in Philadelphia, Pennsylvania, have invented certain Improvements in Packing for Testing-Machines, of which the following is a specification.

The object of my invention is to provide a novel form of packing particularly designed for use with hydraulic machinery employing relatively high fluid pressures, the construction of such packing being relatively simple and the arrangement of its parts being such that it shall satisfactorily perform its functions under the most adverse conditions. These objects and other advantageous ends I secure as hereinafter set forth, reference being had to the accompanying drawings, in which:—

Figure 1, is a vertical section of a testing machine showing my packing as applied thereto; and Fig. 2 is a vertical section on an enlarged scale illustrating the detail construction of my invention.

In the above drawings 2 is the base of a testing machine which is provided with vertically extending columns 3 and a removable platen 22 designed to engage the beam or other body of material under test. This platen is mounted upon a plunger 13 made with a cylindrical portion 12 of less diameter than its head or main portion and operative in a cylindrical cavity in the base 2.

The head or main portion of the plunger is operative in a cylinder 11 mounted on the base 2 and, in order to prevent leakage around the plunger head I provide the said cylinder with a gland 16 of the well known form, holding it in place by bolts as shown, and causing it to act upon the packing which constitutes the main feature of my invention. Said packing is placed in a suitable recess in the walls of the cylinder 11 under the gland and consists of a ring 17 of leather or other suitable material having an inverted U-shaped section, with its two terminal edges beveled inwardly for the reception of the ring 18 which is beveled at both of its edges to fit the beveled edges of said U-shaped ring.

Openings 19 are provided at intervals in the ring 18 and this latter is at all times held in engagement with the ring 17 by means of springs 20 placed at intervals around the cylinder. As is obvious any liquid escaping between the wall of a cylinder 11 and the plunger 13 will pass under the ring 18 and through the same into the interior of the U-shaped ring 17, with the result that the side walls of this latter are spread out with a force depending partly upon the pressure of the liquid and partly on the action of the springs 20 so that further passage of liquid along the side of the plunger 13 or the interior wall of the cylinder is effectually prevented.

I claim:—

1. The combination of a U-shaped flexible packing having its edges inclined; a ring having beveled edges resting on the inclined edges of said flexible packing and provided with openings for permitting the passage of liquid to the packing; and springs back of the ring arranged to force it toward the packing whereby the edges of the latter are forced apart.

2. The combination of a recessed casing; a plunger operative therein; a U-shaped flexible packing located in the recess of the casing and having its edges inclined; a ring having beveled edges resting on the inclined edges of the packing; springs back of the ring and arranged to force the latter toward the packing whereby its edges are forced against the casing and the plunger; said ring being perforated to permit free entrance of fluid to the interior of the packing.

In testimony whereof, I have signed my name to this specification, in the presence of two subscribing witnesses.

TINIUS OLSEN.

Witnesses:
WILLIAM E. BRADLEY,
WM. A. BARR.